United States Patent [19]

Imatani et al.

[11] Patent Number: 4,895,596
[45] Date of Patent: Jan. 23, 1990

[54] METHOD OF RECOVERING PALLADIUM CATALYST

[75] Inventors: Katsuo Imatani; Akira Ishikawa; Masaki Kashibe, all of Ube, Japan

[73] Assignee: Ube Industries, Ltd., Ube, Japan

[21] Appl. No.: 208,751

[22] Filed: Jun. 17, 1988

[30] Foreign Application Priority Data

Jun. 19, 1987 [JP] Japan .................. 62-152545

[51] Int. Cl.$^4$ .................. C22B 11/04; B01J 23/96; C07C 67/343
[52] U.S. Cl. .................. 75/108; 75/117; 75/121; 502/24; 502/30; 502/53; 560/96
[58] Field of Search .................. 502/24, 30, 53, 22, 502/25; 75/108

[56] References Cited

FOREIGN PATENT DOCUMENTS 0046056  2/1982  European Pat. Off. .............. 502/24
134137  10/1980  Japan ..................... 502/24

*Primary Examiner*—Paul E. Konopka
*Attorney, Agent, or Firm*—Frishauf, Holtz, Goodman & Woodward

[57] ABSTRACT

An improved method of recovering a palladium catalyst from a liquid reaction mixture having been produced by oxidative coupling reaction of an aromatic compound in the presence of a catalyst containing palladium(II) salt is disclosed. The improved method comprises heating the liquid reaction mixture under stirring at a temperature of 180° to 280° C. in an atmosphere containing hydrogen gas at a partial pressure of 5 to 60 kg/cm$^2$ whereby reducing the catalyst in the reaction mixture and precipitating a metallic palladium from the reaction mixture.

10 Claims, No Drawings

METHOD OF RECOVERING PALLADIUM CATALYST

BACKGROUND OF THE INVENTION

1. Field of the Invention

The present invention relates to a method of recovering a palladium catalyst. More particularly, the invention relates to a method of recovering a palladium component from a liquid reaction mixture which has been produced by oxidative coupling reaction of an aromatic compound in the presence of the catalyst containing palladium(II) salt.

2. Description of Prior Art

A catalyst containing palladium(II) salt is very useful as a catalyst employable in organic synthesis, for example, that for obtaining a dimer such as tetramethyl biphenyltetracarboxylate from an aromatic compound (e.g., dimethyl phthalate) through oxidative coupling reaction. Since the catalyst is expensive, it is generally used repeatedly after recovery in the form of a metallic palladium (also referred to as "palladium black") after the reaction is complete.

For recovering palladium black, generally known is a method comprising the steps of heating a liquid reaction mixture at a temperature of approx. 60° to 90° C. in a hydrogen gas-containing atmosphere in an autoclave after the above-mentioned reaction is complete, to perform a reduction reaction and to precipitate palladium black, or reducing the liquid reaction mixture at room temperature or a temperture of approx. 60° to 70° C. using a reducing agent such as sodium borohydride or sodium formate to precipitate palladium black, and separating the palladium black from the liquid reaction mixture by filtration, as described in Japanese Patent Publication No. 53(1978)-20009.

However, the above-mentioned method has various problems. For example, the precipitate (i.e., deposit) such as palladium black produced by the reduction reaction in the above-mentioned method is dispersed in the liquid reaction mixture to form a homogeneous slurry with the liquid, and comprises both extremely small sized particles and relatively large sized particles whose diameters are distributed widely in the range of from 0.1 to 100 $\mu$m. Particularly, the extremely small sized particles having a diameter of less than 5 $\mu$m occupy approx. 20 wt. % of all the particles, and such small sized particles of palladium black hardly sedimented even after the liquid reaction mixture is allowed to stand for a long period of time or hardly separated from the liquid reaction mixture even by filtration. Hence, the recovery yield (i.e., recovery ratio) of palladium black is not high.

Further, in the case that the extremely small sized particles of palladium black are not recovered and still remain in the liquid reaction mixture, they bring about adverse effects such as decomposition of a dimerization product (e.g., tetramethyl biphenyltetracarboxylate) and modification thereof when the dimerization product is subjected to a separation procedure from the liquid reaction mixture or a purifying procedure.

In view of the above-described problems, there has been made a proposal to incorporate an alkali metal carbonate such as sodium carbonate or sodium bicarbonate into the reaction mixture when the catalyst in liquid reaction mixture is reduced into metallic palladium, as described in Japanese Patent Publication No. 60(1985)-59974. By adopting this method, relatively large sized particles of palladium black are liable to precipitate, so that a high recovery yield of palladium black can be obtained and deterioration of reaction product can be prevented.

However, the above-mentioned improved method is sometimes industrially disadvantageous, because the method needs an additional procedure of incorporating an alkali metal carbonate.

SUMMARY OF THE INVENTION

It is an object of the present invention to provide an industrially advantageous method for recovering a palladium component of a catalyst in a high yield from a liquid reaction mixture which has been produced by oxidative coupling reaction of an aromatic compound in the presence of a catalyst containing palladium(II) salt.

There is provided by the present invention a method of recovering a palladium catalyst from a liquid reaction mixture having been produced by oxidative coupling reaction of an aromatic compound in the presence of a catalyst containing palladium(II) salt which comprises heating the liquid reaction mixture under stirring at a temperature of 180° to 280° C. in an atmosphere containing hydrogen gas at a partial pressure of 5 to 60 $kg/cm^2$ whereby reducing the catalyst in the reaction mixture to precipitate a metallic palladium from the reaction mixture.

According to the present invention, a precipitate (or deposit) comprising a mixture of palladium black and metallic copper which contains little amount of extremely small particles of palladium black (optionally, as well as metallic copper) having a diameter of less than 5 $\mu$m can be obtained. In other words, most of the precipitate particles have a diameter in the range of 5 to 100 $\mu$m, and moreover the particle diameter distribution range can be narrowed into the range of 30 to 50 $\mu$m by appropriately selecting the processing conditions. The particles of palladium black and metallic copper are contained in the liquid reaction mixture to form a slurry with the liquid, but those particles are satisfactorily large, so that they can be efficiently separated and recovered from the reaction mixture using a conventional filter. Hence, the recovery yield of palladium black can be greatly enhanced.

DETAILED DESCRIPTION OF THE INVENTION

The liquid reaction mixture to be processed by the reduction treatment of the present invention is a liquid which has been produced by oxidative coupling reaction of an aromatic compound in the presence of a catalyst containing palladium(II) salt. There is no specific limitation on the composition of the liquid reaction mixture.

Likewise, there is no specific limitation on the catalyst containing palladium(II) salt, and any catalyst can be employed, provided that it contains palladium(II) salt. An example of the catalyst is a catalyst comprising a palladium(II) salt, a copper salt and a basic bidentate ligand.

Examples of the aromatic compound which is a starting material of the liquid reaction mixture include benzene, toluene, xylene, phthalic acid diester (i.e., o-phthalic acid diester), and halides thereof. Particularly preferred is dimethyl phthalate (i.e., o-dimethyl phthalate).

The present invention will be described in more detail hereinafter referring to a method of recovering palladium through reduction reaction from a liquid reaction mixture having been produced by oxidative coupling reaction of dimethyl phthalate using a catalyst comprising a palladium(II) salt, a copper salt and a basic bidentate ligand.

The palladium(II) salt of the catalyst is a palladium salt of an aliphatic carboxylic acid or that of an inorganic acid. Examples of the palladium salts of an aliphatic carboxylic acid include palladium formate, palladium acetate, palladium propionate, palladium butyrate and palladium valerate. Examples of the palladium salts of an inorganic acid include palladium chloride, palladium sulfate, palladium sulfite, palladium nitrate, palladium nitrite and palladium phosphate.

As the copper salts of the catalysts, there can be mentioned copper salts of an organic or inorganic acid and copper chelate salts of $\beta$-diketone. Examples of the copper salts of an organic acid include copper salts of an aliphatic monocarboxylic or dicarboxylic acid having 1-5 carbon atoms such as copper formate, copper acetate, copper propionate, copper butyrate, copper valerate and copper oxalate. Examples of the copper salts of an inorganic acid include copper sulfate, copper sulfite, copper nitrate, copper nitrite and copper phosphate. Examples of the copper chelate salts of $\beta$-diketones include copper chelate salts of acetylacetone, benzoylacetone and trifluoroacetone.

As the basic bidentate ligands of the catalyst, there can be mentioned 2,2'-biquinoline, bathocuproine, neocuproine, bathophenanthroline, o-phenanthroline and 2,2'-bipyridine.

The oxidative coupling reaction (i.e., dimerization reaction) of dimethyl phthalate is generally carried out by heating a starting material in a dimerization reaction vessel in the presence of the above-mentioned catalyst and an air. After the dimerization reaction is complete, the obtained liquid reaction mixture is introduced into other reaction vessel for recovering the catalyst. In the reaction mixture are homogeneously dispersed the catalyst, dimethyl biphenyltetracarboxylate (i.e., principal reaction product of the dimerization reaction), unreacted dimethyl phthalate, by-products, etc.

The liquid reaction mixture prepared as above is heated under stirring at a temperature of 180° to 280° C. in an atmosphere containing hydrogen gas at a partial pressure of 5 to 60 kg/cm$^2$ according to the present invention.

The heating of the reaction product mixture can be done by introducing steam under pressure or a heating medium into a jacket provided around the reaction vessel. Preferably employed in the invention is a heating medium. Examples of the heating media include liquids or vapors of aromatic compounds such as alkylbenzene, alkylnaphthalene, alkyldiphenyl, diphenyl ether, hydrogenated triphenyl and dibenzyltoluene, and heat-resistant liquids such as paraffinic mineral oils and alkylaromatic mineral oils. The heating temperature is in the range of 180° to 280° C., preferably in the range of 200° to 240° C.

The heating can be carried out in hydrogen gas atmosphere. The hydrogen gas may be injected in the whole amount all altogether into the reaction vessel at once, or may be injected continuously or intermittently thereinto over an appropriate time (e.g., 0 to 4 hours). Otherwise, the hydrogen gas may be supplied into the liquid reaction mixture under bubbling. The hydrogen gas can be employed in the invention in the form of a mixture with other inert gas. A partial pressure of hydrogen gas in the above-mentioned atmosphere for the reduction treatment is in the range of 5 to 60 kg/cm$^2$, preferably in the range of 20 to 35 kg/cm$^2$.

The time for the reduction reaction is generally in the range of 10 minutes to 10 hours, preferably in the range of 30 minutes to 6 hours.

If the reduction conditions (e.g., temperature, time, etc.) are outside of the above-specified ranges, extremely small sized particles (particles having a diameter of less than 5 $\mu$m) of the resulting palladium black or metallic copper tend to increase, and further there arise side reactions such as hydrogenation of the reaction products (namely, biphenyl compound and tetramethyl biphenyltetracarboxylate) and unreacted dimethyl phthalate.

Through the above-described reduction reaction, a metal mixture comprising palladium black and metallic copper precipitates in the liquid reaction mixture to form a slurry with the liquid reaction mixture. The mixture of precipitated metals is then separated from the reaction mixture by filtering the slurry over an appropriate filter.

As the filter employable for the filtration procedure, there can be mentioned a variety of known filters such as a leaf-shaped filter, a streamline-shaped filter and a porous filter. Preferred is a porous filter.

Examples of materials of the above-mentioned filters include porous potteries such as porous plate and sintered metals such as alumina grain. Preferably employable in the invention is a sintered filter having an average pore size of 1 to 5 $\mu$m.

The obtained mixture (i.e., precipitate) comprising palladium black and metallic copper can be readily reproduced to give palladium acetate and copper acetate by washing the mixture with an alkaline solution, activating the washed mixture using formic acid, and causing the mixture to react acetic acid in the presence of a small amount of nitric acid. The separation between the palladium and the copper can be made according to the conventional methods.

The present invention is further illustrated by the following examples.

EXAMPLE 1

Into a 300 ml-round bottom flask equipped with a refluxed condenser, a thermometer, a stirrer and a gas-blowing tube were charged 100 ml (119 g.) of dimethyl phthalate, 180 mg. of palladium acetate, 48 mg. of copper acetate monohydrate and 159 mg. of o-phenanthroline monohydrate, and they were heated at 220° C. in an oil bath for 8 hours, while bubbling air at a rate of 300 ml/min under stirring at approx. 500 rpm, to perform dimerization of dimethyl phthalate so as to produce tetramethyl biphenyltetracarboxylate. The liquid reaction mixture contained 85.1 mg. of palladium and 15.2 mg. of copper.

The reaction mixture produced by the dimerization for 8 hours was introduced into a 300 ml-volume autoclave, and into the autoclave was also charged hydrogen gas in such a manner that hydrogen pressure in the autoclave would be 30 kg/cm$^2$G. The mixture was then heated at 220° C. for 4 hours under stirring at approx. 500 rpm, to reduce the complex of palladium acetate and copper acetate with o-phenanthroline.

The liquid reaction mixture produced by the reduction reaction was filtered over a sintered filter having an average pore size of 1 μm. The precipitate collected by filtration of the liquid reaction mixture was then washed to obtain 99.5 mg. of a precipitate comprising palladium black and metallic copper. The recovery yield of palladium black and metallic copper was 99.2% in total. The recovered precipitate was observed by an electron microscope, and it was confirmed that the particles of the precipitate had diameters within the range of 20 to 50 μm.

Further, it was also confirmed that neither tetramethyl biphenyltetracarboxylate nor dimethyl phthalate in the filtrate was hydrogenated.

EXAMPLE 2

The procedures for the dimerization and the reduction reaction in Example 1 were repeated except for using 183.4 mg. of palladium nitrate instead of palladium acetate.

The liquid reaction mixture produced by the reduction reaction was filtrated over a sintered filter having an average pore size of 1 μm. The precipitate collected by filtration of the liquid reaction mixture was then washed to obtain 99.7 mg. of a precipitate of palladium black and metallic copper in total. The recovery yield of palladium black and metallic copper was 99.4 % in total. The recovered precipitate was observed by an electron microscope, and it was confirmed that the particles of the precipitate had diameters within the range of 20 to 50 μm.

Further, it was also confirmed that neither tetramethyl biphenyltetracarboxylate nor dimethyl phthalate in the filtrate was hydrogenated.

We claim:

1. A method of recovering a palladium catalyst from a liquid reaction mixture having been produced by oxidative coupling reaction of an aromatic compound in the presence of a catalyst containing palladium (II) salt and a basic bidentate ligand, which comprises heating the liquid reaction mixture under stirring at a temperature of 180° to 220° C. in an atmosphere containing hydrogen gas at a partial pressure of 20 to 60 kg/cm$^2$ to reduce the catalyst in the reaction mixture to precipitate a metallic palladium from the reaction mixture.

2. The method as claimed in claim 1, wherein said heating is performed in an atmosphere containing hydrogen gas at a partial pressure of 20 to 35 kg/cm$^2$.

3. The method as claimed in claim 1, wherein said heating is performed at a temperature of higher than 200° C.

4. The method as claimed in claim 1, wherein said heating is performed at a temperature of lower than 240° C.

5. The method as claimed in claim 1, wherein said heating is performed at a temperature of 200°-240° C.

6. The method as claimed in claim 1, wherein said heating is performed for a period of 10 minutes to 10 hours.

7. The method as claimed in claim 1, wherein said catalyst comprises said palladium (II) salt, a copper salt and said basic bidentate ligand.

8. The method as claimed in claim 1, wherein said heating is performed in an atmosphere containing hydrogen gas at a partial pressure of 20 to 35 kg/cm$^2$ and at a temperature of 200° to 240° C. for 10 minutes to 10 hours.

9. The method of claim 8, wherein the heating is performed for 30 minutes to 6 hours.

10. The method as claimed in claim 8, wherein said catalyst comprises said palladium (II) salt, a copper salt and said basic bidentate ligand.

* * * * *